March 25, 1952     L. A. STENGEL     2,590,828
SEPARATION OF HYDROGEN CHLORIDE FROM NITRIC ACID
Filed May 6, 1948
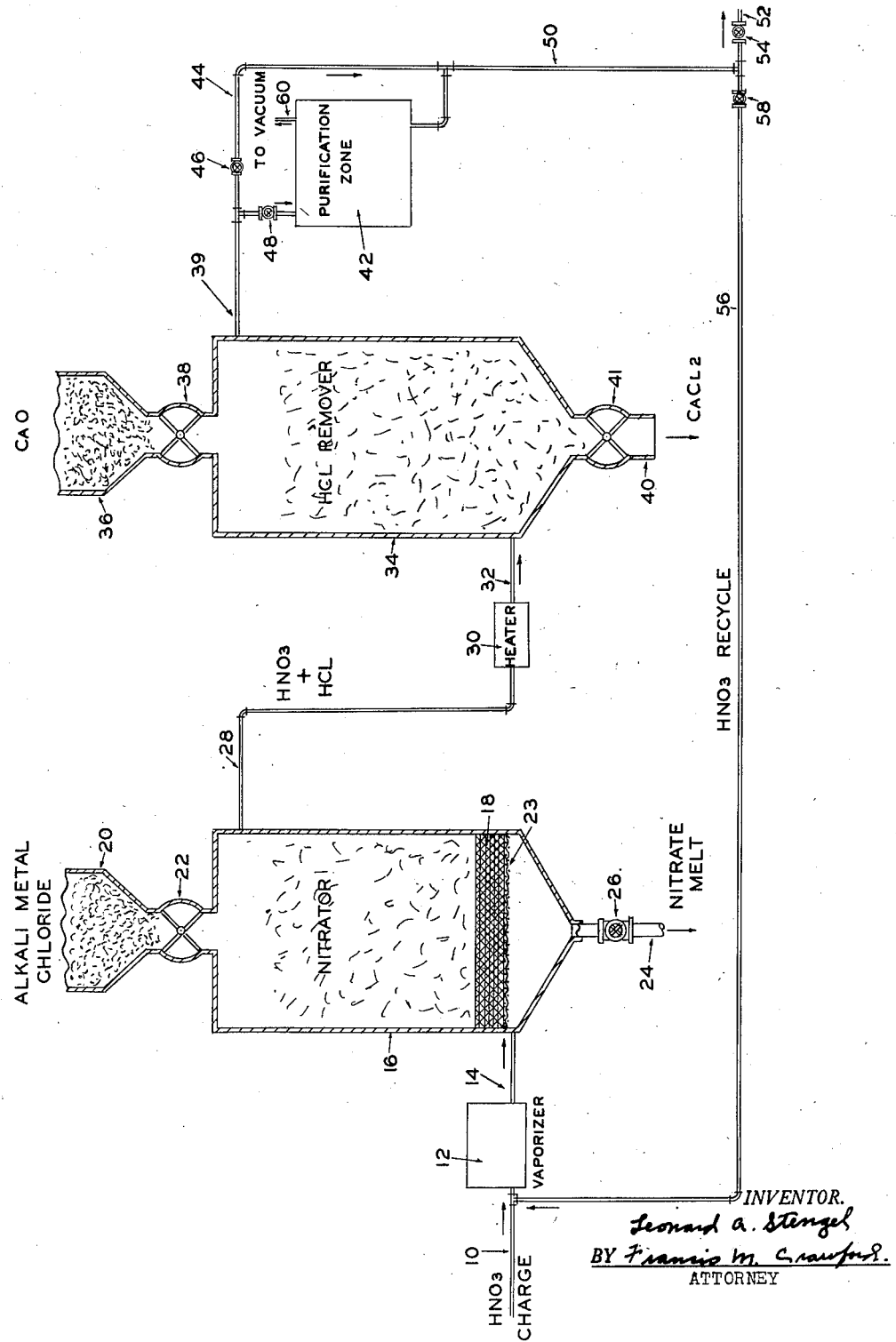
INVENTOR.
Leonard A. Stengel
BY Francis M. Crawford.
ATTORNEY Patented Mar. 25, 1952

2,590,828

UNITED STATES PATENT OFFICE 2,590,828

SEPARATION OF HYDROGEN CHLORIDE FROM NITRIC ACID

Leonard A. Stengel, Terre Haute, Ind., assignor to Commercial Solvents Corporation, Terre Haute, Ind., a corporation of Maryland Application May 6, 1948, Serial No. 25,377

5 Claims. (Cl. 23—154)

This invention relates to a process for the recovery of nitric acid and more particularly relates to a process for separating hydrogen chloride from a mixture containing hydrogen chloride and nitric acid.

In a process for the direct nitration of sodium, potassium or lithium chlorides, or mixtures of these chlorides, with nitric acid vapors, there results a vaporous effluent from the process which comprises a mixture of nitric acid and hydrogen chloride. It is desirable, when effecting nitrations of this character on a commercial scale, to recover the nitric acid which is present in this vaporous effluent. The nitric acid so recovered may be recycled to the nitration zone or utilized for other purposes. In the event of recycle of the nitric acid, it is desirable to remove the hydrogen chloride in order that nitration of the alkali metal chloride will be complete in the nitrator. Accordingly it is one object of this invention to provide a method for separating hydrogen chloride from nitric acid.

A further object of this invention is to provide an inexpensive method for separating hydrogen chloride from nitric acid in vaporous mixtures of the same by the employment of readily available chemical reactants.

A still further object of this invention is the provision of a process for the nitration of alkali metal chlorides wherein the nitric acid in the effluent from the nitration zone is treated by a novel procedure to remove hydrochloric acid and wherein the treated nitric acid is recycled to the nitration zone, or used for other purposes.

Further and additional objects will appear from the following description, the accompanying drawing and the appended claims.

In accordance with this invention, it has been discovered that hydrogen chloride may be separated from nitric acid by passing a vaporous mixture containing hydrogen chloride and nitric acid into contact with a material containing either an oxide or carbonate of calcium or both an oxide and carbonate of calcium, the temperature of contact being maintained above about 550° C. Thus, when a vaporous mixture of hydrogen chloride and nitric acid is contacted with solid particles of an oxide or carbonate of calcium at a temperature above about 550° C. and preferably at a temperature above about 750° C., the hydrogen chloride will selectively react with the oxide or carbonate to form the corresponding calcium chloride. There is no reaction between the contact substance and the nitric acid or nitrogen oxides at these elevated temperatures and nitric acid may be recovered from the effluent vapors with the hydrogen chloride content being depleted to such an extent that the nitric acid is suitable for use in a nitration process by way of recycle or otherwise.

For a more complete understanding of this invention, reference will now be had to the accompanying drawing, wherein is shown a schematic view of an apparatus which may be employed to effect the nitration of an alkali metal chloride in combination with a form of apparatus that may be used in accordance with this invention for separating hydrogen chloride from the vaporous effluent from the nitrator. It will be understood that the drawing is merely schematic to indicate in a general way the over-all process and no attempt has been made to show certain of the control elements or other accessories that may be necessary or desirable in commercial operation. The description to follow assumes that calcium oxide is the reactant for separating hydrogen chloride from the nitric acid. It will be readily apparent, however, that calcium carbonate, or mixtures rich in said materials, may be substituted therefor.

Aqueous nitric acid of about 30% strength is fed through line 10 to vaporizer 12 wherein it is heated to a temperature somewhat above the melting point of the nitrate of the alkali metal chloride being nitrated and preferably between about 100° and about 400° C. The heated vapors are then passed through line 14 to a lower portion of a nitrator 16. The nitrator is provided with a suitable perforated or porous false bottom 18 upon which solid particles of the alkali metal chloride to be nitrated rests and through which the heated vapors of nitric acid may readily pass. The nitrator is also provided with suitable heating means (not shown) to maintain the temperature of the nitrator above the melting point of the metal nitrate being formed, for example, between about 200° C. and about 400° C. A hopper 20 and star wheel arrangement 22 are provided for the continuous or intermittent introduction of solid alkali metal chloride into the nitrator. The star wheel prevents the escape of effluent vapors through the hopper 20. The nitric acid vapors react with the alkali metal chloride in the nitrator to form an alkali metal nitrate in accordance with the following over-all reaction:

wherein M is an alkali metal. Under certain conditions of operation, other oxides of nitrogen, nitrosyl chloride and chlorine may be formed, such being the case particularly when stronger nitric acid, such as 60%, is employed in the nitration zone.

As the nitration proceeds in the nitrator 16, a nitrate melt is formed which flows to the bottom of the nitrator through the false bottom 18 which may be formed of Raschig rings or suitable ceramic material supported on an acid resistant screen or perforated plate 23 and out through a discharge line 24 controlled by a valve 26 or out through a liquid seal arrangement. This is the final desired product of the nitration process.

The effluent vapors from the nitrator escape from the top of the nitrator through the line 28 and this vaporous mixture comprises essentially nitric acid, hydrogen chloride and steam. Under reaction conditions where a 30% nitric acid is charged to the nitrator and the nitrator is maintained somewhat above the melting point of the nitrate being produced, the vaporous mixture passing through line 28 may contain about 15% by weight of hydrogen chloride and about 13% by weight of nitric acid. The vaporous mixture is passed from line 28 through a heater 30 and line 32 to a hydrogen chloride removing chamber 34. This chamber is packed with solid particles of calcium oxide, calcium carbonate, or material rich therein, which are continuously introduced therein from a hopper 36 by means of a star wheel or other feeding device 38. The reaction chamber 34 is heated by any suitable means (not shown) which, in combination with the vapor heater 30, maintains the temperature within the chamber 34 at above about 550° C. and preferably above 750° C. At these elevated temperatures the hydrogen chloride in the vaporous mixture selectively reacts with the calcium oxide to form calcium chloride and water. Vapors from which nitric acid can be recovered escape from the top of the reaction chamber 34 through the line 39. Calcium chloride and any unreacted calcium oxide are continuously withdrawn from the reaction chamber 34 through a lower discharge pipe 40 controlled by a star wheel 41. If desired, a suitable mechanical conveyor (not shown) may be associated with the bottom of the reaction chamber 34 to assist in the removal of the calcium chloride.

The vapors from the reaction chamber 34 are withdrawn through line 39 and may be passed through a further purification zone 42 in which a portion of the water or other impurities may be separated by standard procedures. If desired, the purification zone 42 may be by-passed through line 44 controlled by valve 46. Valve 48 controls the introduction of the vapors into the purification zone 42. The recovered nitric acid, from which substantially all of the hydrogen chloride has been removed, is withdrawn from the system through lines 50 and 52 controlled by valve 54. If desired and as preferred, a portion or all of the nitric acid is recycled to the charge line 10 through recycle line 56 which is controlled by valve 58, or the nitric acid vapors can be passed directly into another alkali metal chloride nitrating vessel similar to vessel 16.

It will be apparent from the foregoing description that an effective process has been provided for removing hydrogen chloride from the hydrogen chloride-nitric acid-containing mixtures. In the specific example given the agent for effecting removal of hydrogen chloride is calcium oxide. However, as above suggested, calcium carbonate, or a material rich in calcium oxide and/or carbonate may be substituted for calcium oxide under certain conditions of operation. In the event that the carbonates are employed, then the effluent from the hydrogen chloride-removing zone will contain substantial quantities of carbon dioxide. In such an event the purification zone 42 may consist of a cooler or receiver or equipment to concentrate the nitric acid, and also may include means for separating a substantial portion of this carbon dioxide before recycling the recovered nitric acid back to the vaporizer 12.

In the operation of the over-all process as above described, it is usually preferred that the system be maintained under a slight vacuum in order to prevent the escape of vapors into the atmosphere from the points of charge and discharge of solids and/or liquids to the reaction chambers. In order to effect this desired result, a source of vacuum (not shown) may be connected with the purification zone 42 through line 60.

As indicated above, the hydrogen chloride separation process of this invention may be used in many types of commercial operations where it is desired to separate a mixture of hydrogen chloride and nitric acid. The present invention is particularly useful, however, in a nitration process wherein the vaporous effluents from the nitrator comprise a mixture of nitric acid and hydrogen chloride. An example of such a nitration process, as indicated above, is one in which an alkali metal chloride is nitrated to a corresponding alkali metal nitrate. The invention has been found to be particularly useful in the nitration of Sylvinite ore, as described in my co-pending application, U. S. Serial Number 694,133, filed August 30, 1946, now Patent No. 2,535,989. Of course it will be apparent that pure alkali metal chlorides, such as sodium, potassium or lithium chloride, or artificial or naturally occurring mixtures thereof, may be nitrated in substantially the same manner as indicated above.

The reagents employed for the selective removal of hydrogen chloride in accordance with this invention are inexpensive and readily available from naturally occurring limestone, dolomitic limestone or the calcination products thereof.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A process of removing hydrogen chloride from vaporous mixtures containing hydrogen chloride and nitric acid, which comprises passing such a mixture through a reaction zone maintained at a temperature of at least about 550° C. in direct contact with a contract substance selected from a class consisting of calcium oxide, calcium carbonate and mixtures rich in these compounds, and cooling the effluent vapors to recover nitric acid.

2. The process of claim 1 wherein the temperature of said reaction zone is maintained above about 750° C.

3. A nitration process which comprises contacting an alkali metal chloride at elevated temperatures with vaporous nitric acid in a nitrating reaction zone, separately withdrawing from said zone an alkali metal nitrate and a vaporous mixture containing nitric acid and substantial quantities of hydrogen chloride, passing the said vaporous mixture through a contact purifying zone maintained at a temperature of at least about 550° C. in direct contact with a substance selected from a class consisting of calcium oxide, calcium carbonate and mixtures rich in these compounds, separately withdrawing vapors depleted in hydrogen chloride from said contact zone and recycling them back to the said nitrating reaction zone.

4. A continuous process of removing hydrogen chloride from vaporous mixtures containing hydrogen chloride and nitric acid, which comprises continuously passing such a mixture through a reaction zone maintained at a temperature of at least about 550° C. in direct contact with a contact substance selected from a class consisting of calcium oxide, calcium carbonate and mixtures rich in these compounds, withdrawing chloride-containing reaction products from the bottom of the reaction zone, feeding additional contact substance into the top of said zone and cooling the effluent vapors to recover nitric acid.

5. A process of removing hydrogen chloride from vaporous mixtures containing hydrogen chloride and nitric acid, which comprises continuously passing such a vaporous mixture upwardly through a reaction zone maintained at a temperature above about 550° C., passing calcium oxide downwardly through said zone in direct contact with said vaporous mixture, withdrawing chloride-containing reaction products from the bottom of said zone and cooling the effluent vapors to recover nitric acid.

LEONARD A. STENGEL.

REFERENCES CITED

The following references are of record in the file of this patent:

UNITED STATES PATENTS

| Number | Name | Date |
|---|---|---|
| 1,865,303 | Charrier | June 28, 1932 |
| 1,954,415 | Kipper | Apr. 10, 1934 |

OTHER REFERENCES

"Manufacture of Nitric Acid and Nitrates," page 151, vol. 6, by Lunge, 1923 ed., D. Van Nostrand Co., N. Y.

"A Comprehensive Treatise on Inorganic and Theoretical Chemistry," vol. 2, page 200, 1922 ed., and vol. 3, 1923 ed., pp. 663, 700, 714, 840, 857, 860, and vol. 8, 1928 ed., pp. 572, 574. Longmans Green & Co., N. Y.